3,335,173
PRODUCTION OF TRIFLUOROETHYL-
TRIFLUOROACETATE
Louis G. Anello, Basking Ridge, N.J., assignor to Allied Chemical Corporation, New York, N.Y., a corporation of New York
No Drawing. Filed Apr. 20, 1964, Ser. No. 361,285
4 Claims. (Cl. 260—487)

This invention relates to trifluoroethyltrifluoroacetate and more particularly to a process for its preparation. Trifluoroethyltrifluoroacetate is a known compound having a boiling point of about 55° C.

It has been proposed to make trifluoroethyltrifluoroacetate by the hydrogenation of $(CF_3CO)_2O$ in the presence of platinum. The above procedure and other known prior art procedures are characterized by low temperature liquid phase batch operations with low conversions. Such procedures obviously afford little commercial potentialities.

An object of the present invention is to produce trifluoroethyltrifluoroacetate by a solid catalyst procedure which embodies none of the operating disadvantages of the prior art. Another object is to produce trifluoroethyltrifluoroacetate in a simple and efficient manner in high yield and with a high degree of purity. Other objects and advantages will be apparent from the following detailed description.

In accordance with the present invention, it has been found that trifluoroethyltrifluoroacetate may be made in a gas-phase catalysis operation by reacting in admixture $CF_3COCl$ and $CF_3CH_2OH$ vapors in the presence of an activated carbon catalyst.

General practice of the invention includes passing mixtures of $CF_3COCl$ and $CF_3CH_2OH$ vapors over activated carbon granular catalyst at substantially atmospheric pressure and at temperatures within the range of about 75 to 250° C. in quantity and for a time sufficient to form the desired trifluoroethyltrifluoroacetate product and recovering the latter from the resultant reaction products. More particularly, vapors of $CF_3COCl$ and $CF_3CH_2OH$ are continuously metered, mixed and fed into a tubular reactor which is packed preferably full of active carbon solid catalyst and which may be made of inert material such as Alundum, nickel, Monel, or Inconel and enveloped in a suitable tubular electric furnace provided with automatic heating means for reaction zone temperature maintenance. The reaction involved in practice of the invention may be represented by

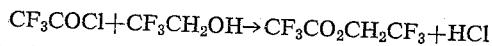

$CF_3COCl + CF_3CH_2OH \rightarrow CF_3CO_2CH_2CF_3 + HCl$

Product recovery may be effected more or less conventionally as in this art. For example, reaction zone exit may be passed through a receiver and suitably cooled such as by the use of a Dry Ice-acetone mixture for condensation of the exit gases. The non-condensed gases may be passed through water scrubbers to remove hydrochloric acid. The resulting condensate then may be fractionally distilled in suitable equipment to facilitate recovery of the sought-for product and separation of unreacted materials which may be recycled.

As indicated, the catalyst which has been found to effectuate reaction between $CF_3COCl$ and $CF_3CH_2OH$ starting material at a temperature within the range of 75 to 250° C. and at substantially atmospheric pressure is an activated carbon solid material. The activated carbons which may be used to make the catalyst are granular materials readily available from several commercial sources, suitable materials being various grades of activated carbon such as Columbia SXC, Columbia SW and Darco. Granular size of the activated carbons employed is not critical. Ordinarily, reaction is carried out in elongated tubular reactors and in these instances, it is desirable to employ, for the production of the activated carbon catalyst activated carbon granules of average mesh size between 1/25 and 1/4 of the reactor diameter, and better conditions are those in which the reactor is substantially completely filled with granules of average mesh size of about 1/8 or 1/10 of the diameter dimension of the reactor.

On charging $CF_3CH_2OH$ and $CF_3COCl$ into the reactor, significant reaction proceeds at any temperature high enough to maintain the organic starting materials in the gas phase. Ordinarily, it is preferred to maintain reactor temperature at not less than about 70° C. The reaction zone temperature may be varied over a wide range, however, such as from about 75 to 250° C. Ordinarily, however, reaction temperatures in the range of 80 to 150° C. are employed with temperatures of 80 to 105° C. being preferred. With regard to mole ratio of $CF_3COCl$ to $CF_3CH_2OH$ theoretical requirements are approximately one mole of $CF_3COCl$ to one mole of $CF_3CH_2OH$. Less than theoretical quantities of $CF_3COCl$ may be employed, but to no advantage, and such proportions of reactants is not preferred. Generally, the mole ratio of $CF_3COCl$ to $CF_3CH_2OH$ may lie in the range of 0.25:1 to 1:0.25, preferably in the range of 1 to 1.

As above indicated, the process may be carried out at substantially atmospheric pressure although super-atmospheric or sub-atmospheric pressures may be employed if desired. It will be understood that in the practice of gas-phase catalytic processes of the general type described herein, i.e. processes in which a gas stream is flowed successively through reaction and product recovery systems, for all practical purposes, as related to reactions themselves, pressure is considered as being substantially atmospheric. Technically, however, pressures in such systems are sufficiently on the positive side to effect commercially satisfactory gas flow through the apparatus train. Thus, strictly speaking, depending upon factors such as apparatus design, mesh size of catalyst, unpacked gas space in the reactor, desired contact time, etc., actual pressures in systems of the kind under consideration may vary from two up to say 10 to 15 pounds gauge, and accordingly, operations of this type are included in the designation of substantially atmospheric pressure.

Contact time may be varied considerably without noticeable disadvantage to high process efficiency. Generally, increasing contact time and reactor temperatures results in high reactivity. Significant conversions are effected at contact times as short as 0.5 second and contact time may be as high as five minutes or more. Preferably, contact times usually may lie in the range of one to 60 seconds. To a substantial extent, contact time, reactor temperature and ratio of reactants are interrelated, and depending upon apparatus and the particular operation at hand optimum conditions as to contact time may be determined by test runs.

Product recovery may be effected more or less conventionally as in this art. The reactor exit contains trifluoroethyltrifluoroacetate, unreacted organic starting materials and hydrochloric acid. The reactor exit may be passed through a Dry Ice acetone trap refrigerated to a temperature of about −78° C. to condense the bulk of the gases. Any uncondensed gases leaving the trap may be passed through water to absorb the hydrochloric acid. The condensate in the trap may then be suitably fractionally distilled to recover trifluoroethyltrifluoroacetate in substantially pure form.

The following illustrates practice of the invention.

*Example 1*

One hundred ml. of Columbia SXC activated carbon, 6 to 8 mesh, were charged into a 5/8" I.D. tubular reactor, 36 inches long, heated externally over about 30 inches in length by an electric furnace provided with automatic temperature control. During a period of 4¾ hours, a mixture of 225 grams (1.7 mols) of $CF_3COCl$ (B.P. −18.5° C.) and 356 grams (3.56 mols) $CF_3CH_2OH$ (B.P. 74.5° C.) were passed over the catalyst at a reaction temperature of 82 to 85° C. and a retention time of 10.6 seconds. Exit products of the reactor were passed in a Dry Ice acetone trap and non-condensed gases leaving the trap were passed into water where the hydrochloric acid was absorbed. Liquid collected in the cold trap was refluxed under a head cooled with Dry Ice and some hydrochloric acid was expelled and absorbed in water. Titration of the combined aqueous hydrochloric acid solutions showed 1.55 mols. Fractional distillation of the cold trap product, 537 grams, effected recovery of 304 grams (1.55 mols) $CF_3CO_2CH_2CF_3$ and 203 grams (2.03 mols) $CF_3CH_2OH$. Thus, of the starting material fed, 91% was converted and recovered. Yield based on starting material consumed was 91%.

*Example 2*

A mixture of 289 grams (2.19 mols) $CF_3COCl$ and 247 grams (2.47 mols) $CF_3CH_2OH$ were reacted in accordance with the procedure of Example 1 except that the reaction temperature was 104° C. There was recovered 2.02 mols hydrochloric acid in the water scrubber and 463 grams in the cold trap. Distillation of the cold trap product effected recovery of 408 grams (2.08 mols)

$$CF_3CH_2CO_2CF_3$$

and 22 grams (0.22 mol) $CF_3CH_2OH$. Thus, of the starting material fed, 97% was converted and recovered. Yield based on starting material consumed was 97%.

*Example 3*

A mixture of 276 grams (2.08 mols) $CF_3COCl$ and 239 (2.39 mols) $CF_3CH_2OH$ was reacted in accordance with the procedure in Example 1. There was recovered 2.0 mols hydrochloric acid in the water scrubber and 449 grams in the cold trap. Distillation of the cold trap product effected recovery of 400 grams (2.03 mols)

$$CF_3CO_2CH_2CF_3$$

and 33 grams (0.33 mols) $CF_3CH_2OH$. Thus, of the starting material fed, 98% was converted and recovered. Yield based on starting material consumed was 98%.

*Example 4*

A mixture of 81 grams (0.61 mol) $CF_3COCl$ and 71 grams (0.71 mols) $CF_3CH_2OH$ was reacted in accordance with the procedure in Example 1 except that the activated carbon catalyst was removed from the reactor and the reactants passed through an unpacked reactor. There was very little evolvement of hydrochloric acid during the reaction, indicating no reaction. Distillation of the cold trap product effected recovery of 80 grams (0.60 mol) $CF_3COCl$ and 60 grams (0.60 mol) $CF_3CH_2OH$. Thus, $CF_3COCl$ does not react with $CF_3CH_2OH$ in the gas phase in an unpacked reactor.

Although certain preferred embodiments of the invention have been disclosed for purpose of illustration, it will be evident that various changes and modifications may be made therein without departing from the scope and spirit of the invention.

I claim:
1. A process for the production of trifluoroethyltrifluoroacetate which comprises maintaining a mixture of trifluoroacetyl chloride and trifluoroethanol vapors, at a temperature below about 250° C., in contact with an activated carbon catalyst to effect reaction of trifluoroacetyl chloride and trifluoroethanol to produce trifluoroethyltrifluoroacetate.
2. The process of claim 1 in which the temperature is substantially in the range of 75 to 250° C.
3. The process of claim 1 in which the mole ratio of the trifluoroacetyl chloride and trifluoroethanol is substantially in the range of 0.25:1 to 1:0.25.
4. A process for the production of trifluoroethyltrifluoroacetate which comprises maintaining a mixture of trifluoroacetyl chloride and trifluoroethanol vapors in contact with an activated carbon catalyst at substantially atmospheric pressure and at a temperature substantially in the range of 80 to 105° C. and at a mole ratio of trifluoroacetyl chloride to trifluoroethanol substantially in the range of 1 to 1 to effect reaction of trifluoroacetyl chloride and trifluoroethanol to produce trifluoroethyltrifluoroacetate.

References Cited

UNITED STATES PATENTS

| | | | |
|---|---|---|---|
| 2,697,115 | 12/1954 | Clower et al. | 260—487 |
| 3,052,717 | 9/1962 | Regan | 260—487 X |
| 3,226,418 | 12/1965 | Anderson et al. | 252—444 X |

OTHER REFERENCES

Haszeldine et al.: Journal of the Chemical Society, January 1959, pp. 387—396.

LORRAINE A. WEINBERGER, *Primary Examiner.*

A. P. HALLUIN, *Assistant Examiner.*